US012113908B2

(12) United States Patent
Srivastava et al.

(10) Patent No.: US 12,113,908 B2
(45) Date of Patent: Oct. 8, 2024

(54) VALIDATING ELECTRONIC DEVICES IN A BLOCK CHAIN NETWORK

(71) Applicant: Hand Held Products, Inc., Charlotte, NC (US)

(72) Inventors: Shaurya Srivastava, Hyderabad (IN); Satyam Singh, Hyderabad (IN)

(73) Assignee: Hand Held Products, Inc., Charlotte, NC (US)

( * ) Notice: Subject to any disclaimer, the term of this patent is extended or adjusted under 35 U.S.C. 154(b) by 353 days.

(21) Appl. No.: 17/247,462

(22) Filed: Dec. 11, 2020

(65) Prior Publication Data

US 2021/0306154 A1    Sep. 30, 2021

(30) Foreign Application Priority Data

Mar. 30, 2020   (IN) .............................. 202011013822

(51) Int. Cl.
*H04L 9/32*    (2006.01)
*H04L 9/00*    (2022.01)
(Continued)

(52) U.S. Cl.
CPC ............ *H04L 9/3239* (2013.01); *H04L 41/12* (2013.01); *H04N 7/18* (2013.01); *H04L 9/50* (2022.05)

(58) Field of Classification Search
CPC ......... H04L 9/3239; H04L 41/12; H04L 9/50; H04L 41/0866; H04N 7/18; H04N 7/181
(Continued)

(56) References Cited

U.S. PATENT DOCUMENTS 10,348,488 B1 *  7/2019  Paczkowski .......... H04L 9/0643
2014/0325588 A1  10/2014  Szeto et al.
(Continued)

FOREIGN PATENT DOCUMENTS

BR    PI0815605 B1 *  8/2008  ............... H04L 9/32
CN    109068147 A   * 12/2018
(Continued)

OTHER PUBLICATIONS

Billström, et al. Video Integrity through Blockchain Technology. 2017. KTH Royal Institute of Technology, Master's Thesis (96 pages).

*Primary Examiner* — David R Lazaro
*Assistant Examiner* — Mariegeorges A Henry
(74) *Attorney, Agent, or Firm* — Alston & Bird LLP

(57) ABSTRACT

A method is described. The method can include establishing a block chain network of multiple imaging devices. The block chain network can be established such that, at least a first imaging device of the multiple imaging devices can be validated by at least a second imaging device of the multiple imaging devices. Further, the method can include generating a block message by the first imaging device. The block message can be generated by using a secured hash function and based on a set of parameters that can be associated with the first imaging device. The set of parameters can include, a first imaging device identifier, a network fluctuation parameter, and at least one inertial parameter. Furthermore, the method can include sending by the first imaging device the block message to the second imaging device. In this regard, the block message can facilitate validation of the first imaging device.

20 Claims, 8 Drawing Sheets

(51) Int. Cl.
*H04L 41/12* (2022.01)
*H04N 7/18* (2006.01)

(58) Field of Classification Search
USPC .......................................................... 348/159
See application file for complete search history.

(56) References Cited

U.S. PATENT DOCUMENTS

| | | |
|---|---|---|
| 2016/0275461 A1 | 9/2016 | Sprague et al. |
| 2017/0134162 A1 | 5/2017 | Code et al. |
| 2017/0206523 A1 | 7/2017 | Goeringer et al. |
| 2018/0337769 A1* | 11/2018 | Gleichauf ............. H04L 9/0637 |
| 2020/0356082 A1* | 11/2020 | Wang .................... G06F 21/645 |

FOREIGN PATENT DOCUMENTS

| | | | |
|---|---|---|---|
| JP | 4543570 B2 * | 9/2010 | |
| WO | WO-2015191141 A2 * | 12/2015 | ............. B33Y 10/00 |

\* cited by examiner

VALIDATING ELECTRONIC DEVICES IN A BLOCK CHAIN NETWORK

CROSS REFERENCE TO RELATED APPLICATIONS

This application claims priority to and the benefit of foreign Indian Provisional Patent Application Serial No. 202011013822, filed on Mar. 30, 2020 with the Government of India Patent Office and entitled "Validating Electronic Devices In A Block Chain Network," each of which is incorporated herein by reference in its entirety.

TECHNOLOGICAL FIELD

Example embodiments described herein relate generally to systems, methods, and apparatuses for validating electronic devices in a block chain network, and, more particularly, to validating an imaging device in the block chain network.

BACKGROUND

In an industrial environment, many electronic devices such as, but not limited to, imaging devices, cameras, handheld devices, portable data terminals, barcode scanners, RFID readers, mobile devices, smartphones, laptops, and/or the like, are used to perform various operations. In some example establishments, these electronic devices can be connected over a network (e.g. a communication network) and can exchange various types of data amongst each other. For instance, in an example industrial environment, multiple imaging devices (e.g. cameras) installed at various locations within the industrial environment can be connected over a network and can be used for purpose of monitoring and surveillance. In this regard, a monitoring station (e.g. a centralized server) can receive data (e.g. video streams) captured by these imaging devices and can perform monitoring or surveillance of the industrial environment based on processing the data. Typically, in many industrial environments, it is desired to maintain security of such electronic devices and protect integrity of data shared by these devices. Any compromise of the electronic device or data transacted by the electronic device can pose challenges.

SUMMARY

The following presents a simplified summary to provide a basic understanding of some aspects of the disclosed material handling system. This summary is not an extensive overview and is intended to neither identify key or critical elements nor delineate the scope of such elements. Its purpose is to present some concepts of the described features in a simplified form as a prelude to the more detailed description that is presented later.

In accordance with an example embodiment, a method is described. The method can comprise establishing a block chain network of a plurality of imaging devices. The block chain network can be established such that, at least a first imaging device of the plurality of imaging devices of the block chain network can be configured to be validated by at least a second imaging device of the plurality of imaging devices. Further, the method can include generating a block message by the first imaging device of the block chain network. The block message can be generated by using a secured hash function and based on a set of parameters that can be associated with the first imaging device. For instance, the set of parameters can include, a first imaging device identifier, a network fluctuation parameter, and at least one inertial parameter. Furthermore, the method can include sending by the first imaging device the block message to the second imaging device of the plurality of imaging devices. In this regard, the block message can facilitate validation of the first imaging device.

In an example embodiment, the method can further include receiving, by the first imaging device a first message indicative of a successful validation of the first imaging device. In this regard, the first imaging device can be validated by the second imaging device based on a comparison of the block message with a predefined block message.

In another example embodiment, the method can further comprise receiving, by the first imaging device, an alert based on an un-successful validation of the first imaging device.

According to an example embodiment, the plurality of imaging devices can be configured to capture a video stream of one or more sections of an industrial environment. Said that, the method can further comprise determining, by the first imaging device, a compromise of the first imaging device. Further, based on determining the compromise of the first imaging device, the method can comprise initiating a termination of the first imaging device from the block chain network.

According to one example embodiment, the method can further comprise adding, by the first imaging device, the block message in a ledger maintained by each of the plurality of imaging devices. In this regard, addition of the block message in the ledger can be based on a previous block message generated based on a previous secured hash function.

In an example embodiment, the block message generated by the first imaging device can be generated in response to a change in at least one parameter of the set of parameters associated with the first imaging device.

In an example embodiment, the network fluctuation parameter used for generating the block message can be indicative of at least one of: a blip, a long pause, a short pause, a recording rate, and a slow streaming, associated with a video stream captured by the first imaging device.

Some example embodiments described herein relates to a non-transitory computer readable medium that can store thereon computer-executable instructions that in response to execution by a processor can perform operations. The operations can include establishing a block chain network of a plurality of imaging devices. The operations can further include generating, a block message associated with a first imaging device by using a secured hash function and based on a set of parameters associated with the first imaging device. The set of parameters can include, a first imaging device identifier, a network fluctuation parameter, and at least one inertial parameter. The operations that can be performed by the processor can further include sending the block message to a second imaging device of the plurality of imaging devices. The block message can be used for validation of the first imaging device.

According to an example embodiment, a system is described. The system can include a processor. The processor can be communicatively coupled to at least two imaging devices. The at least two-imaging device can be from amongst a plurality of imaging devices of a block chain network. In accordance with said example embodiment, the processor can be configured to initiate, by a first imaging device of the block chain network, a transmission of a block message to a second imaging device of the plurality of imaging devices. The block message can be generated by using a secured hash function based on a set of parameters associated with the first imaging device. In this regard, the set of parameters can include, a first imaging device identifier, a network fluctuation parameter, and at least one inertial parameter. Further, the processor can be further configured to validate the first imaging device in response to receiving of a first message from the second imaging device by the first imaging device of the block chain network. The first imaging device can be validated based on comparison of the block message with a predefined block message.

In an example embodiment, the first imaging device can be configured to broadcast the first message to remaining imaging devices of the plurality of imaging device. Further, in an example embodiment, the processor can be configured to send an alert to the second imaging device based on an un-successful validation of the first imaging device. Furthermore, the processor can be configured to initiate a termination of the first imaging device from the block chain network.

In an example embodiment, the processor can be configured to generate the block in response to a change in at least one parameter of the set of parameters associated with the first imaging device.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
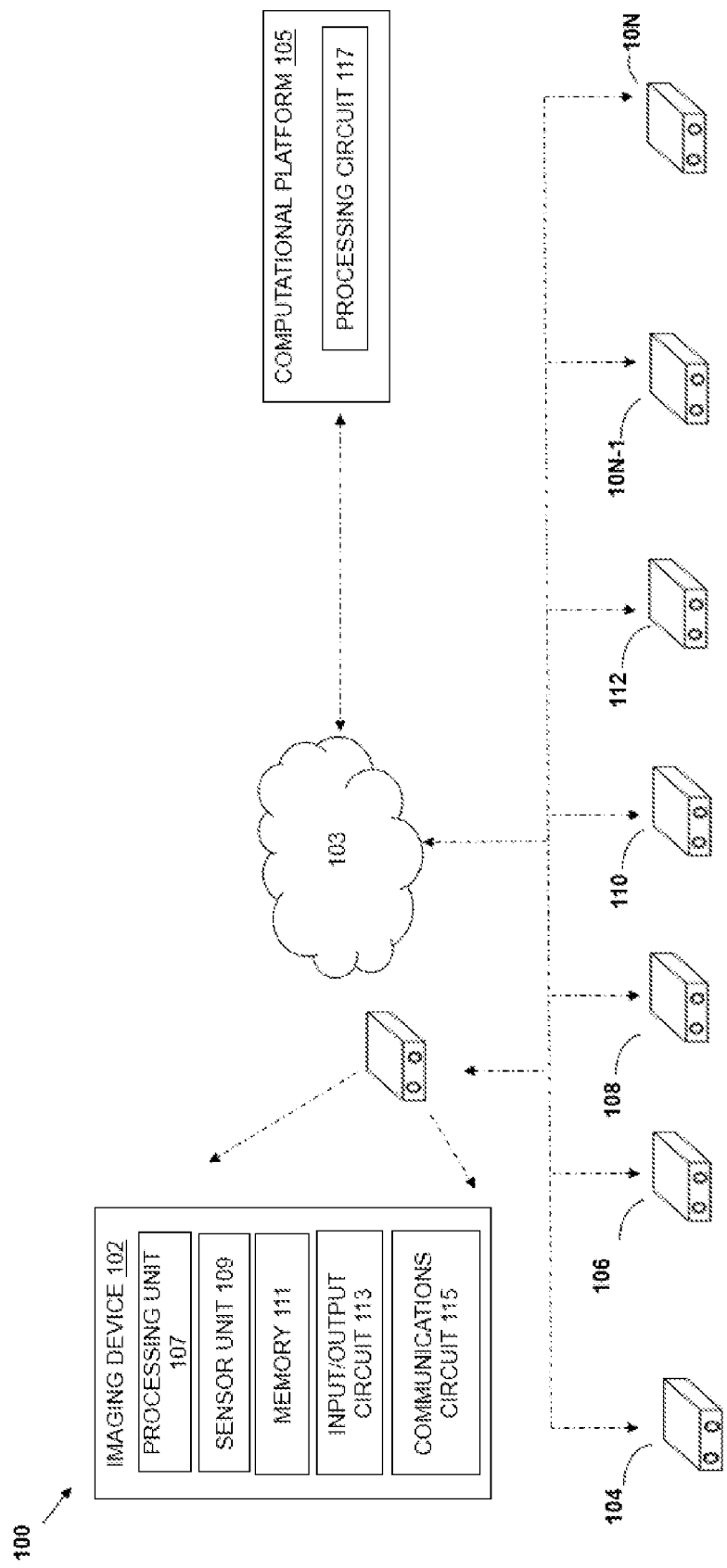
FIG. 1 illustrates an exemplary system comprising a plurality of imaging devices of a block chain network, in accordance with some example embodiments described herein.

Some embodiments of the present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various embodiments of the disclosure described herein such that embodiments may comprise fewer or more components than those shown in the figures while not departing from the scope of the disclosure.

In accordance with various example embodiments described herein, the term "imaging device" can refer to an optical instrument that can be configured to capture or record, an image and/or a video, of an object and/or environment. For instance, in some examples, the imaging device can be a camera that can capture a series of image frames (i.e. a video feed) and can be used for surveillance purposes in an industrial environment. Further, the imaging device can be configured to communicate a data (e.g. the video feed or images) to a computational platform (e.g. a monitoring station or a remote server).

According to some example embodiments, the imaging device can correspond to any of, but not limited to, a digital camera, a camcorder, a video camera, and/or security cameras (e.g. a box camera, a dome camera, a PTZ camera, a bullet camera, an IP camera, a day/night camera, a thermal camera, a wireless IP camera, a wide dynamic security camera, etc.) and/or the like. In some examples, the imaging device can be installed at a defined location in an industrial environment for monitoring operations and condition of equipments that may be installed in the industrial environment.

The various embodiments are described herein using the term "computational platform" to refer to any computing device or a distributed network of computing device capable of functioning as a server, such as a master exchange server, web server, mail server, document server, or any other type of server. In some examples, the computational platform can correspond to a monitoring station that can be used for monitoring data captured by various electronic devices in an industrial environment. For instance, in an example, the computational platform can be used by an administrator of an industrial environment to monitor data recorded by various devices installed in the industrial environment. A computational platform may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smartphone, thereby enabling it to function as an Internet server (e.g., an enterprise e-mail server) only to the extent necessary to provide the functionality described herein. In some example embodiments, the computational platform may correspond to any of, an industrial computer, a cloud computing-based platform, an external computer, a standalone computing device, and/or the like. In some example embodiments, the computational platform, can also refer to any of the electronic devices, as described herein. In some examples, the computational platform may be configured to process data received from the plurality of electronic devices, provide actionable insights based on the data, and initiate actions based on the processed data.

FIG. 1 illustrates an exemplary system 100 comprising a plurality of imaging devices (102, 104 . . . . 10N) of a networked environment, in accordance with some example embodiments described herein. Illustratively, the networked environment referred herein represents an environment, where a first imaging device 102 can be communicatively coupled to remaining imaging devices (104-10N) of the plurality of imaging devices 102-10N. The plurality of imaging devices (102, 104 . . . . 10N) may correspond to such electronic devices that may be commissioned and/or configured to perform a particular functionality in a working environment (e.g. an industrial site). In some examples, the plurality of imaging devices (102, 104 . . . . 10N) may correspond to one or more cameras (e.g. closed circuit television (CCTV) cameras) that may be installed at various locations within an industrial environment (e.g. an oil refinery or a chemical manufacturing plant) for monitoring and surveillance purposes.

According to some example embodiments, the networked environment referred herein, may correspond to an environment or set-up in which one or more of, the plurality of imaging devices (102, 104 . . . . 10N) can be interconnected to one another and can communicate data amongst one another using a network 103. The network 103 referred herein may correspond to a communication network that can support communication of data amongst the plurality of imaging devices (102-10N). In some example embodiments, the network 103 may correspond to communication network, for example, but are not limited to, a Wireless Fidelity (Wi-Fi) network, a Piconet, a Personal Area Network (PAN), Zigbee, and a Scatternet. In some examples, the network 103 may correspond to a short range wireless network through which the plurality of imaging devices (102-10N) may communicate with each other using one or more communication protocols such as, but are not limited to, Wi-Fi, Bluetooth, Bluetooth low energy (BLE), Zigbee, and Z-Wave. In some examples, the network 103 can correspond to a network in which the plurality of imaging devices (102-10N) may communicate with each other using other various wired and wireless communication protocols such as Transmission Control Protocol and Internet Protocol (TCP/IP), User Datagram Protocol (UDP), and 2G, 3G, or 4G communication protocols. In some examples, the communication network 103 can correspond to any communication network such as, but not limited to, LORA, cellular (NB IoT, LTE-M, Leaky Feeder Coax, etc.). In some example embodiments, the network 103 can correspond to a block chain network established amongst the plurality of imaging devices (102-10N).

In some example embodiments, a block chain network may be established by the plurality of imaging devices (102-10N). In other words, one or more imaging devices of the plurality of imaging devices (102-10N) can be part of the blockchain network and can validate remaining of the imaging devices. The block chain network can correspond to a decentralized distributed database system in which one or more nodes can participate, transact data, and maintain a shared digital ledger.

Further, the block chain network can include a series of data blocks that can be generated, by one or more of the imaging devices (102-10N) based on a security protocol or cryptographic technique. The data blocks can be time-stamped such that a second data block can be dependent on a first data block that may have been generated at an earlier time-instance. The data blocks may also be interlinked based on hash codes. For example, a second hash code of the second data block may be based on a first hash code of the first data block. Further, these data blocks transacted amongst the devices of the block chain network can be used for validating nodes (i.e. remaining devices) of the block chain network. Said that, each data block can be generated according to a sequence of generation time and/or linked with other data blocks in a time-stamped orderly series fashion based on hash codes to from a data chain, called as the blockchain.

As stated earlier, in accordance with an example embodiment, the network 103 illustrated in FIG. 1 can correspond to the block chain network. According to various example embodiments described herein, any imaging device of the plurality of imaging devices (102-10N) can initialize establishment of the network 103 (e.g. the block chain network) which can be used thereafter for transaction of the data. Further, an imaging device (e.g. a first imaging device 102) of the plurality of imaging devices (102-10N) can be validated by any of remaining imaging devices (i.e. imaging devices 103-10N), from amongst the plurality of imaging devices (102-10N). As an example, in the block chain network, a first imaging device 102 can be validated by a second imaging device 104 of the plurality of imaging devices (102-10N).

In the block chain network, the data (e.g., but not limited to, image frames or video streams) captured or recorded by one or more of the imaging devices (102-10N) can be generated and transacted in form of time-stamped immutable records. Further, this data can be managed in a distributed fashion by cluster of devices i.e. the imaging devices (102-10N) of the network 103. To this end, in some example embodiments, each of the plurality of imaging devices (102-10N) can maintain a digital ledger (e.g. a shared file system) to record time-stamped data transactions amongst the plurality of imaging devices (102-10N). Said that, any imaging device can perform validation of the remaining imaging devices based on processing the data blocks and comparing outputs with expected output (e.g. hash codes), details of which are described later in the description.

Illustratively, the system 100 can also comprise a computational platform 105. In some example embodiments, the plurality of imaging devices 102-10N may be communicatively coupled to the computational platform 105, via the network 103. According to an example embodiment, the computational platform 105 can correspond to a remote server or a monitoring device that can be used by an administrator in an industrial environment to monitor data captured by the imaging devices (102-10N). In some example embodiments, the computational platform 105 can correspond to a data analytics platform (e.g. a cloud-based service) that can be configured to receive data from the plurality of imaging devices 102-10N, perform analysis on the data and provide actionable insights. For instance, in an example, the computational platform 105 can receive video streams captured by plurality of imaging devices 102-10N, process the video streams to identify events (e.g. fault occurred in an industrial device, leakage, hazard, compromise of the industrial device etc.) and can initiate actions (e.g. trigger alarm, terminate operations of the industrial device etc.) based on the processed video streams.

According to some example embodiments, each imaging device of the plurality of imaging devices (102-10N) can comprise components that can be configured to perform various operations. Illustratively, a first imaging device 102 can comprise at least one of: a processing unit 107, a sensor unit 109 (e.g. an optical sensor), a memory 111, an input/output circuit 113, and a communication circuit 115. In some examples, one or more of the sensor unit 109, the memory 111, the input/output circuit 113, the communication circuit 115 may be communicatively coupled to the processing unit 110. Further, the computational platform 105 may also comprise a processing circuit 117 and some of similar components like the memory 111, the sensor unit 109, the communication circuit 115, the input/output circuit 113, and/or the like as described in reference to the first imaging device 102.

In an example embodiment, the sensor unit 109 that may include an image sensor and one or more lenses to form a real image of a field-of-view of the first imaging device 102 onto the image sensor. In this regard, an image sensor (e.g., CMOS sensor, CCD sensor, etc.) may be used to create a digital image. The sensor unit 109 may also include other sensors e.g. inertial sensors like gyroscope, accelerometer etc. that may be configured to record physical movement associated with the first imaging device 102.

According to some example embodiments, the processing units 107 and the processing circuit 117 referred herein, can correspond to any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, the processing unit 116 can refer to an integrated circuit, an application-specific integrated circuit (ASIC), a digital signal processor (DSP), a field-programmable gate array (FPGA), a programmable logic controller (PLC), a complex programmable logic device (CPLD), a discrete gate or transistor logic, discrete hardware components, or any combination thereof designed to perform the functions described herein. In some examples, the processing unit 116 can also exploit Nano-scale architectures such as, but not limited to, molecular and quantum-dot based transistors, switches and gates, in order to optimize space usage or enhance performance of user equipment.

Further, the communication circuit 115 referred herein, may be configured to receive and/or transmit data from/to a network and/or any other device, circuitry, or module in communication over the network 103. To this end, in some example embodiments, the communications circuit 115 referred herein, may be any means such as a device or circuitry embodied in either hardware or a combination of hardware and software associated with the respective component of the system 100. In some examples, the communications circuit 115 may comprise a network interface for enabling communications with a wired or wireless communication network. For example, the communications circuitry may comprise one or more network interface cards, antennae, buses, switches, routers, modems, and supporting hardware and/or software, or any other device suitable for enabling communications via the network 103. Additionally, or alternatively, the communications circuit 115 may comprise the circuitry for interacting with the antenna(s) to cause transmission of signals via the antenna(s) or to handle receipt of signals received via the antenna(s). These signals may be transmitted by any of the components of the system 100 and/or the processing unit 107 over the network 103, using a number of wireless personal area network (PAN) technologies, such as, but not limited to, Bluetooth® v1.0 through v3.0, Bluetooth Low Energy (BLE), infrared wireless (e.g., IrDA), ultra-wideband (UWB), induction wireless transmission, and/or the like or via a wired communication technology, such as a data field bus, cables etc. In an example embodiment, the communication circuit 115 may be configured to support transmission and receiving of data communicated through the first imaging device 102.

According to some example embodiments, the I/O circuit 113 may, in turn, be in communication with the processing unit 107 to provide output to a user and, in some embodiments, to receive an indication of user input. The I/O circuit 113 may comprise a user interface and may comprise a display that may comprise a web user interface, a mobile application, a client device, and/or the like. In some embodiments, the I/O circuit 113 may also comprise a keypad, a joystick, a touch screen, touch areas, soft keys, a microphone, a speaker, or other input/output mechanisms. In some examples, the processing unit 107 and/or a user interface circuitry comprising a processor associated with the I/O circuit 113 may be configured to control one or more functions of one or more user interface elements associated with the I/O circuit 113 through computer program instructions (e.g., software and/or firmware) stored on the memory 111 accessible to the processing unit 107. Further details of the components of the first imaging device 102 and/or the plurality of imaging devices (102-10N) are also described in reference to FIGS. 7 and 8.

In accordance with an example embodiment, the plurality of imaging devices (102-10N) can record data (e.g. image frames or video streams) and can share the recorded data amongst each other. Further, the imaging devices can be in a block chain network such that, each imaging device of the plurality of imaging devices (102-10N) can be validated by any of remaining imaging devices of the plurality of imaging devices (102-10N). Validation referred herein throughout the description corresponds to determining if an imaging device is an authentic or trusted device of the block chain network. In other words, validation can refer to identifying that the imaging device being validated is non-compromised, non-malicious, and/or the like. Said that, an imaging device may not be validated if the imaging device is compromised and/or if the data associated with the imaging device loses at least one of privacy, integrity, and authenticity. In accordance with various example embodiments described herein, validation of the plurality of imaging devices (102-10N) can be performed by using block messages that can be generated using secured hash function, details of which are described in reference to FIGS. 2-6. In this regard, in accordance with some example embodiments, block messages used for validating the plurality of imaging devices (102-10N) can be generated based on a set of parameters associated with the imaging devices, respectively. The set of parameters can be one or more of, a device identifier, a network fluctuation parameter, an inertial parameter etc.

Figure 2:
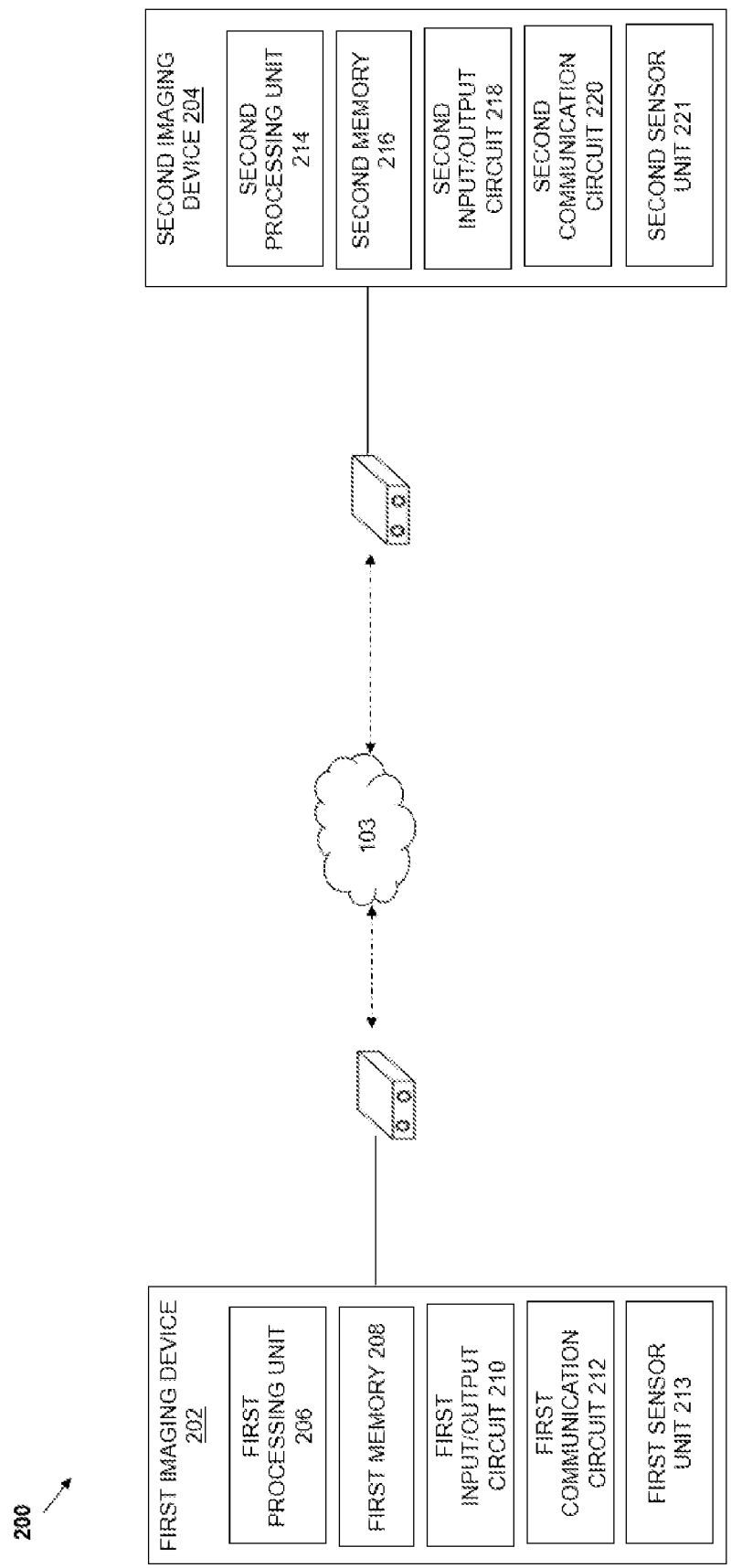
FIG. 2 illustrates an exemplary system comprising a first imaging device and a second imaging device of the block chain network, in accordance with some example embodiments described herein.

FIG. 2 illustrates an exemplary system 200 comprising a first imaging device 202 and a second imaging device 204, in accordance with some example embodiments described herein. Illustratively, the first imaging device 202 can be communicatively coupled to the second imaging device 204, via the network 103. The network 103, in some examples, can correspond to the block chain network, as described in reference to FIG. 1. Illustratively, the first imaging device 204 can comprise various components, viz. a first processing unit 206, a first memory 208, a first input/output circuit 210, a first communication circuit 212, and a first sensor unit 214. The first processing unit 206 can be communicatively coupled to one or more of, the first memory 208, the first input/output circuit 210, the first communication circuit 212, and the first sensor unit 214, and can command operations of the respective components. Further, the second imaging device 204 can comprise a second processing unit 214, a second memory 216, a second input/output circuit 218, a second communication circuit 220, and a second sensor unit 221. The second processing unit 214 can be communicatively coupled to one or more of, the second memory 216, the second input/output circuit 218, the second communication circuit 220, and the second sensor unit 221. In an example embodiment, the first imaging device 202 and the second imaging device 204 can further be communicatively coupled to the computational platform 105.

According to an example embodiment, the first imaging device 202 and the second imaging device 204 can be communicatively coupled with each other, as respective nodes of the block chain network. In this aspect, each node of the block chain network can correspond to an electronic device (e.g. an imaging device) that can be configured to generate blocks (i.e. data block messages) using a secured hash function. As described earlier in reference to FIG. 1, the blocks can be time-stamped and orderly linked. In other words, a hash code of a block can be dependent on a previous hash code of a previous block. Further, the blocks can be transacted amongst the distributed set of nodes of the block chain network and can be used for purpose of validating one or more nodes of the block chain network. Said differently, as all blocks are interlinked and possess dependency on previously blocks, a block generated by a first node of the block chain network can be processed by a second node to identify validity of the first node.

As an example, the first processing unit 206 of the first imaging device 202 can be configured to generate a block message. The block message can be generated using a secured hash function. In an example, the secured hash function can be a secured hash algorithm (SHA)-256 cryptographic hash function. In other examples, the secured hash function can be based on other secured hash algorithms such as, SHA-384 or SHA-512. To this end, in an example, when using the SHA-256 cryptographic hash function, a message digest size can be of 256 bits, an input message size can be of 2^64 bits, and a block size can be of 512 bits. However, other variations of the hash functions can be possible based on size of output expected from the secured hash function. According to some examples, the block message can be generated in response to occurrence of an event or in a periodic fashion. For example, the block message may be generated based on identification of a change in one or more parameters associated with the first imaging device. In some examples, the block message can be generated periodically after a defined time period. In some other examples, the block message may be generated at a time of initial configuration of the imaging device.

In accordance with an example embodiment, the block message may include at least one of, a header, block data (i.e. a payload), and a hash code. The block message can be generated using a set of parameters that can be provided as inputs to the secured hash function. In other words, these set of parameters and/or corresponding data associated with the set of parameters can inputted as plain text to the secured hash function that can generate a hash code as an output. In accordance with an example embodiment, the set of parameters referred herein, can be associated with a node of the block chain network. For example, the block message may be generated using the secured hash function to which set of parameters associated with the imaging device and/or the data associated with the imaging devices, can be provided as inputs.

In an example embodiment, the first imaging device 202 can generate a block message that can include block data and hash code. For instance, in an example, the block data may include at least one of: a unique identifier associated with the first imaging device 202, inertial data (e.g. data pertaining to physical movement) associated with the first imaging device 202, data pertaining to network fluctuations associated with the first imaging device 204 etc., more details of which are described in reference to FIGS. 3-6. In accordance with said example embodiment, the block message may include a hash code generated using the block data and a hash code of a previous block message (i.e. block message generated at an earlier time instance). In an example embodiment, the block message may be generated based on the secured hash function SHA-256. To this end, the hash code generated based on the stated set of parameters can be of size 256-bit length. Further, the block message generated by the first processing unit 206 can be stored in the first memory 208.

Further, in accordance with said example embodiment, the block message generated by the first processing unit 206 can be transmitted to other imaging devices of the block chain network. In an example, the first communication circuit 212 may support transmission of the block message. Transmission of the block message, according to some examples may correspond to any of a broadcasting or multicasting of the block message to remaining nodes of the block chain network. Accordingly, the first communication circuit 212 may transmit the block message, via the network 103, to other imaging devices that may have been communicatively coupled over the network 103. Said that, the second communication circuit 220 of the second imaging device 204 can receive the block message transmitted by the first imaging device 202.

In accordance with an example embodiment, the second processing unit 214 of the second imaging device 204 can be configured to perform validation of the first imaging device 202 using the block message received from the first imaging device 204. For that matter, in accordance with various example embodiments described herein, validation of the first imaging device 202 can be performed by any imaging device of the block chain network. To this end, it may be understood, that by using the secured hash function, each block message generated by an imaging device of the blockchain network is unique. In other words, no two block messages generated using the secured hash function, by the imaging devices of the block chain network, can have same hash code. In accordance with said example embodiment, upon receiving of the block message, the second processing unit 214 can parse the block message to identify the hash code in the block message. Further, the second processing unit 214 can access a pre-defined or expected hash code and compare it with the hash code extracted from the block message, to validate the first imaging device 202. The pre-defined hash code may be generated by the second imaging device 204 based on a pre-defined consensus protocol shared amongst the nodes of the block chain network. In some examples, the hash code can be representative of a digital signature that can uniquely identify an imaging device of the block chain network.

In accordance with an example embodiment, in response to processing the block message, the second processing unit 214 may generate an outcome indicative of a successful or an un-successful validation of the first imaging device 202. In accordance with various example embodiments described herein, each data transaction amongst the first imaging device 202 and the second imaging device 204 can be recorded and added to a digital ledger maintained by each of the plurality of imaging devices of the block chain network. In some examples, the addition of the block message in the digital ledger can be based on a previous block message. The previous block message may be generated based on a previous secured hash function by the first imaging device 202. Further, in an example, in response to un-successful validation of the first imaging device, the second processing unit 214 may send an alert to other imaging devices of the block chain network. Based on receiving of the alert, the remaining imaging devices can stop performing a validation operation associated with the first imaging device 202. Further, in some examples, in response to un-successful validation, the first imaging device 202 can be terminated and removed off from the block chain network. Further details of validation of the imaging devices of the block chain network are described in reference to FIGS. 3-6.

Figure 3:
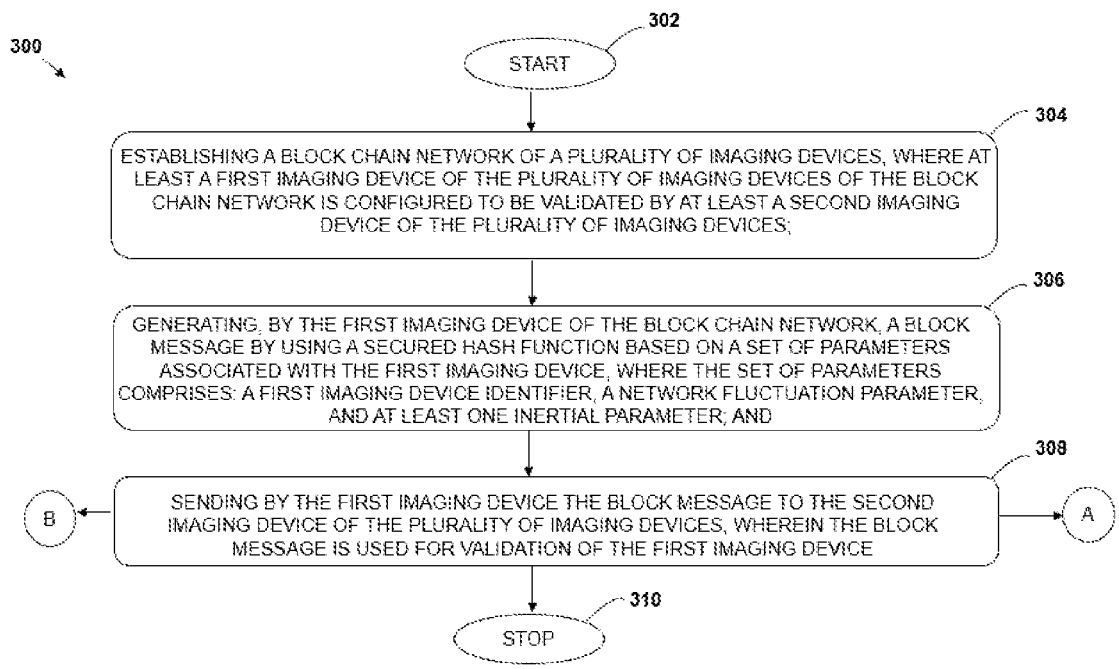
FIG. 3 illustrates an example flowchart representing a method of validating a first imaging device of the block chain network, in accordance with some example embodiments described herein.
Figure 4:
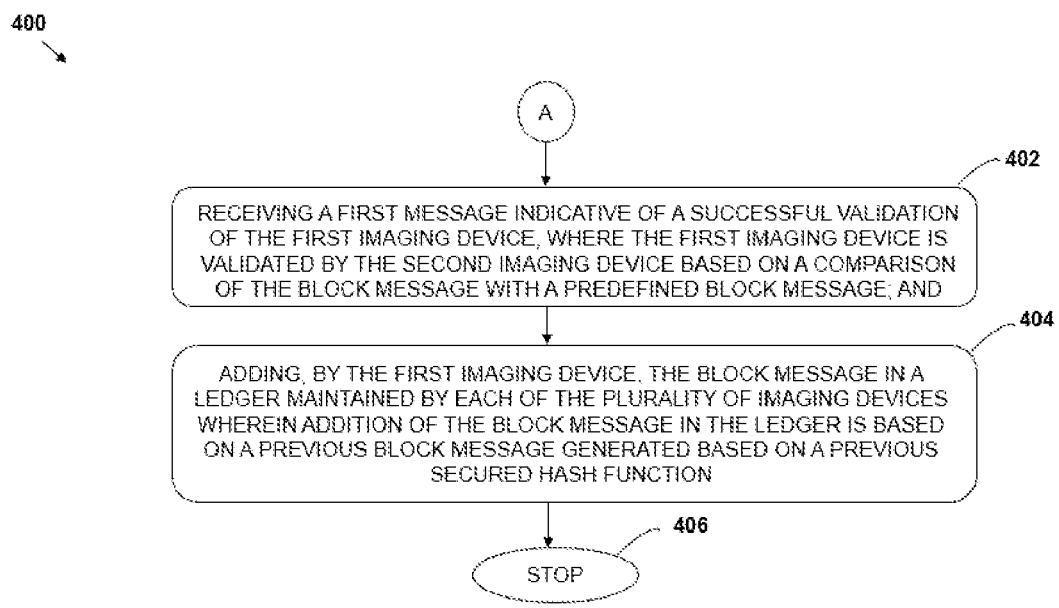
FIG. 4 illustrates an example flowchart representing a method of successful validation of the first imaging device of the block chain network, in accordance with some example embodiments described herein.
Figure 5:
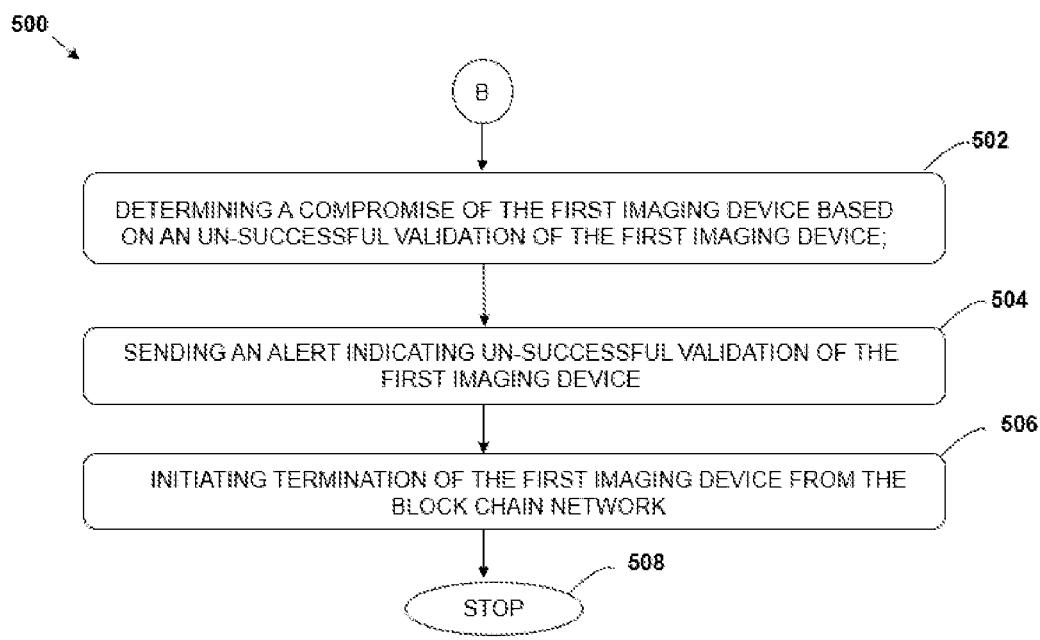
FIG. 5 illustrates an example flowchart representing a method of termination of the first imaging device from the block chain network, in accordance with some example embodiments described herein.

FIGS. 3 through 5 illustrate, example flowcharts of the operations performed by an apparatus, such as an imaging device of the plurality of imaging devices (102 . . . 10N) of FIG. 1, in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for the implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block (s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 3 through 5, when executed, convert the computer or processing circuitry into a particular machine configured to perform an example embodiment of the present invention. Accordingly, the operations of FIGS. 3 through 5 can define an algorithm for configuring a computer or processor, to perform an example embodiment. In some cases, a general-purpose computer may be provided with an instance of the processor which performs the algorithm of FIGS. 3 through 5 to transform the general-purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowchart, can be implemented by special purpose hardware-based computer systems which perform the specified functions, or combinations of special purpose hardware and computer instructions.

FIG. 3 illustrates an example flowchart representing a method 300 of validating an imaging device, e.g. a first imaging device (102, 202), of a block chain network, in accordance with some example embodiments described herein. Illustratively, the method 300 starts at step 302.

At step 304, a block chain network of the plurality of imaging devices 102-10N may be established. In one example embodiment, the block chain network may be established by the computational platform 105. In this regard, the computational platform 105 may include means such as, the processing circuit 117 to initiate establishment of the block chain network amongst the plurality of imaging devices 102-10N. In another example embodiment, establishment of the block chain network may be initiated by any other imaging device of the plurality of imaging devices 102-10N.

In another example embodiment, the first imaging device (102, 202) may initiate establishment of the block chain network with other remaining imaging devices (104-10N, 204). In this regard, in some examples, establishment of the block chain network may involve creation of a digital ledger by the first imaging device (102, 202). The digital ledger can be maintained by the plurality of imaging devices (102-10N, 204). In other words, upon establishment of the block chain network, each participating node of the block chain network can maintain the digital ledger and can further approve and enable entry of blocks (i.e. block messages) into the digital ledger. To this end, as described earlier, one or more of the data transactions amongst the plurality of imaging devices (102-10N) of the block chain network may be recorded in the digital ledger. In some examples, each node of the block chain network can generate a unique block which can be added to the digital ledger. The blocks can be entered to the digital ledger based on using any data structure format (e.g. but not limited to, pointers, linked lists etc.). To this end, in the block chain network each entry of the block in the digital ledger is unique in a manner that a hash code present in the block uniquely identifies the imaging device that generated the respective block. To this end, each block that can be entered in the ledger, excluding a first block, can contain a hash code generated based on a portion of a previous block.

As an example, a second block may include a hash code generated based on a header or a payload portion of the first block. Said that, the blocks are so linked in the chain such that, any change to a portion of any block can populate further changes to remaining blocks in the digital ledger. In this manner, in the block chain network, each participating node can validate other participating nodes of the block chain network by detecting changes in hash code of the block messages that may have been populated from previous blocks. In this regard, the block chain network can be established such that each participating node of the block chain network may follow a predefined consensus protocol for validating the blocks generated by respective nodes.

Moving to step 306, the first imaging device (102, 202) can comprise means such as, the first processing unit (107, 206) that can generate a block message. The block message can be generated based on using a secured hash function and a set of parameters associated with the first imaging device 102. The set of parameters can include parameters associated with the first imaging device (102, 202) and/or a data associated with the first imaging device (102, 202). In some examples, the set of parameters can include, a first imaging device identifier, a network fluctuation parameter, and at least one inertial parameter.

According to some example embodiments, the set of parameters associated with the first imaging device (102, 202) can include a parameter such as, a device identifier (e.g. a CCTV ID, a MAC address, and/or the like) that can uniquely identify the first imaging device 102. Further, the set of parameters can also include a parameter such as, an inertial parameter indicative of inertial data associated with the device. For example, the inertial parameter can be indicative of physical movement associated with the first imaging device (102, 202). For instance, the inertial parameter may include a gyroscopic data, accelerometer data, and/or the like, that may have been sensed by the first sensor unit 213 of the first imaging device (102, 202). In this regard, in an example, an inertial data may be recorded by a sensor unit (e.g. the first sensor unit 213 or sensor 209) associated with the first imaging device 102 in an event of a physical movement experienced by the first imaging device 102. For example, in case of a physical compromise of the first imaging device 102, the inertial data may be recorded.

As mentioned earlier, the set of parameters may also include parameters associated with data recorded or transacted by the first imaging device (102, 202). For instance, in some examples, the first imaging device (102, 202) may capture a video feed of an environment and stream it over a communication network to the computational platform 105 (i.e. a monitoring station). In this regard, in some examples, the set of parameters may include a network parameter indicating of fluctuation in a recording rate (frames/sec) or a streaming rate, a blip, a long pause, a short pause associated with image frames/video feed captured and transacted by the first imaging device 102.

Below table represents an example of data of a block message generated by the first imaging device (102, 202):

| Data Item | Stored As |
| --- | --- |
| Hash Previous Block | 256-bit hash of previous block header |
| Network Fluctuations | 256-bit hash based on input data. |
| Physical Movements | 256-bit hash based on input data. |
| CCTV Unique ID | 256-bit hash |

In accordance with an example embodiment, the block can include a hash code generated based on one or more of the data provided in the above table. The hash code can be generated based on secured hash function, e.g., but not limited to, SHA256, SHA516, and/or the like. In an example, the hash code can be generated using the secured hash function based on equation as stated below:

$$Blocklevelhash = SHA256\ (previousblock\_hash + SHA256(networkparameter) + SHA256(inertialparameter) + SHA256(deviceidentifier))$$

Moving to step 308, the first imaging device (102, 202) may comprise means such as, a communication circuit (113, 212) to send the block message to the second imaging device 204. The block message sent to the second imaging device 204 can be used for validation of the first imaging device (102, 202) by the second imaging device 204.

In some examples, the first imaging device (102, 202) may send the block message to all remaining imaging devices of the block chain network. For example, the first imaging device 202 may broadcast or multicast the block message to all remaining imaging devices (104-10N, 204). In this regard, any of the remaining imaging devices can perform validation of the first imaging device (102, 202). To this end, validation of the first imaging device (102, 202) can be performed based on comparing the hash code present in the block message received from the first imaging device (102, 202) with an expected or pre-defined hash code. In this regard, if the hash code present in the block message matches with the expected or pre-defined hash code, the first imaging device (102, 202) can be successfully validated. Alternatively, if the hash code present in the block message does not matches with the expected or pre-defined hash code, the first imaging device (102, 202) validation of the first imaging device 102 can be deemed un-successful. The method stops at step 310.

In some example embodiments, a node (e.g. an imaging device) of the block chain network that performs the validation of the first imaging device (102, 202) can update remaining nodes of the block chain network about an outcome (i.e. successful validation or un-successful validation) of the first imaging device (102, 202). Accordingly, the remaining nodes may stop any validation operation if already initiated for the first imaging device (102, 202). Further, based on the successful or un-successful validation of the first imaging device (102, 202), the remaining imaging devices of the plurality of imaging devices (102-10N) can update the digital ledger maintained for the block chain network at its respective end. For example, in response to successful validation, the digital ledger can be updated by entering the block message entry in the digital ledger, details of which are described further in reference to FIG. 4.

FIG. 4 illustrates an example flowchart representing a method 400 of successful validation of the first imaging device (102, 202) of the block chain network, in accordance with some example embodiments described herein. In some examples, the method 400 may be started, in response to sending of the block message by the first imaging device (102, 202), as described at step 308 of the method 300.

At step 402, the first imaging device (102, 202) may comprise means such as, the first communication circuit (113, 212) to receive a first message indicative of a successful validation of the first imaging device (102, 202). In this regard, as described earlier, the first imaging device (102, 202) can be validated based on a comparison of the hash code of the block message generated by the first imaging device (102, 202) with a pre-defined or expected hash code.

Validation of the first imaging device (102, 202) can be performed by any node (i.e. remaining imaging devices) of the block chain network. Accordingly, the first message indicating the successful validation of the first imaging device (102, 202) can be received from any of the remaining imaging devices of the block chain network that may have validated the first imaging device 102. In one example, the first message may be received from the second imaging device 204 that may have performed validation of the first imaging device (102, 202). In some examples, the first message indicative of successful validation of the first imaging device (102, 202) can be broadcasted and can be received at all nodes of the block chain network and/or to the computational platform 105. In that manner, each node of the block chain network can be informed about the first imaging device (102, 202) to be a trusted device and a non-compromised entity.

Moving to step 404, in response to receiving of the first message indicative successful validation, the block message generated by the first imaging device (102, 202) can be added in the digital ledger that maintained by the plurality of imaging devices (102-10N, 204). In other words, each node of the blockchain network can update the digital ledger maintained, at its respective end, by adding the block message generated by the first imaging device (102, 202) in the digital ledger. In this regard, the block message may be added in the digital ledger such that, a hash code of the block message can be linked with a previous hash code (i.e. of the previous block message). To this end, addition of the block message in the digital ledger maintained by the nodes of the block chain network, reflects acceptance of the first imaging device as a trusted and non-compromised device of the block chain network.

As described earlier, in some example embodiments, multiple nodes of the block chain network can be installed in an industrial environment (e.g. a chemical plant or a manufacturing site). In some example scenarios, a node (e.g. an imaging device) of the block chain network may be compromised. The compromise of the node of the block chain network, as referred herein, can correspond to one or both of, a physical compromise (e.g. changing a positioning of the imaging device) and/or a software compromise i.e. compromise of data recorded by the imaging device (e.g. due to a cyber-attack, spoofing etc.). In this regard, it may be desired to protect each node and integrity of the data shared by each node of the block chain network. Said that, in accordance with various example embodiments described herein, each node of the block chain network may be configured to generate the block message which can be verified by remaining nodes of the block chain network to validate the authenticity of the respective node. To this end, generation of the block message and verification of the block message can be performed periodically after a pre-defined period (e.g. a user-defined time period).

FIG. 5 illustrates an example flowchart representing a method 500 of termination of the first imaging device (102, 202) from the block chain network, in accordance with some example embodiments described herein. At step 502, the system 100 may comprise means such as, the second processing unit 214 of the second imaging device 204, that can determine a compromise of the first imaging device (102, 202). In an example embodiment, determination of the compromise of the first imaging device (102, 202) can be based in response to un-successful validation of the first imaging device (102, 202) based on the block message sent by the first imaging device (102, 202), as described at step 308 of the method 300.

In some examples, a further investigation to identify the compromise of the first imaging device (102, 202) can be performed. For instance, in some examples, based on a notification of un-successful validation of the first imaging device (102, 202), the processing circuit 117 of the computational platform 105 (e.g. a monitoring station) can access a video stream captured by the first imaging device (102, 202) to identify a physical compromise of the first imaging device (102, 202). In this regard, the processing circuit 117 may use any computer vision technique to identify unknown personnel from the video stream. To this end, the processing circuit 117 may access from a database, images of known or trusted personnel, and use any image processing to recognize known and unknown personnel in the video stream of an industrial environment captured by the first imaging device (102, 202). In some examples, real-time location of each trusted personnel in the industrial environment can be tracked by the computational platform 105 to investigate a cause of compromise of the first imaging device (102, 202).

At step 504, the second imaging device 204 may comprise means such as, the second communication circuit 220 to send an alert indicating an un-successful validation of the first imaging device (102, 202). In an example, the alert can be sent to the first imaging device (102, 202). In another example, the alert can be sent to all nodes of the block chain network. In this aspect, based on receiving of the alert, each of the remaining imaging devices of the plurality of imaging devices (102-10N) can stop transacting data with the first imaging device (102, 202).

Moving at step 506, the second imaging device 204 may comprise means such as, the second processing unit 214 that may cause termination of the first imaging device (102, 202) from the block chain network. Termination of the first imaging device (102, 202) may correspond to removal or disassociation of the first imaging device (102, 202) from the block chain network. The method stops at step 508.

Figure 6:
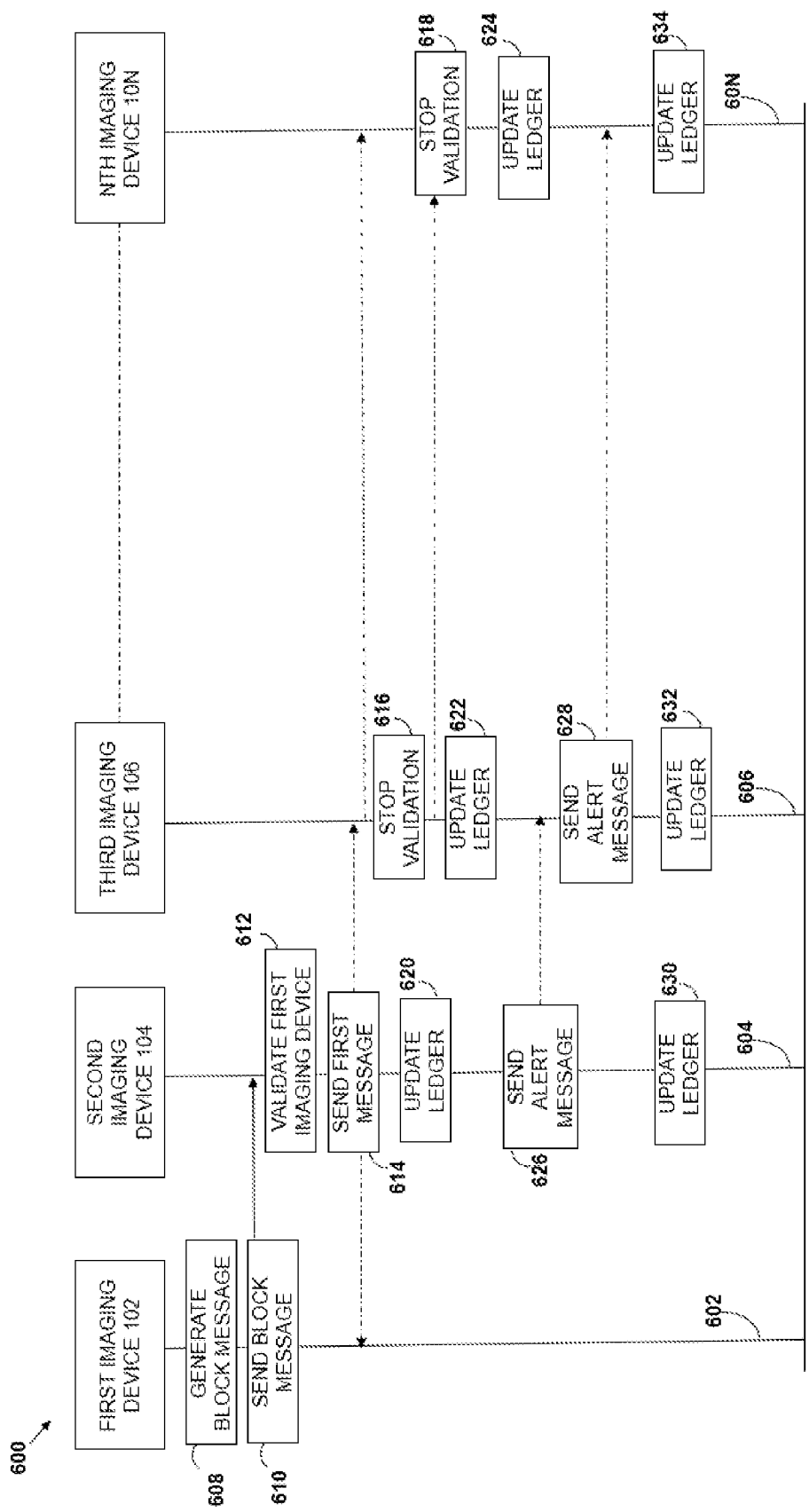
FIG. 6 illustrates an example message flow diagram representing communication between plurality of imaging devices of the block chain network, in accordance with some example embodiments described herein.

FIG. 6 illustrates an example message flow diagram 600 representing communication between plurality of imaging devices (102-10N) of the block chain network, in accordance with some example embodiments described herein. Said differently, the message flow diagram 600 illustrates a sequence of messages and data communication amongst nodes (e.g. the plurality of imaging devices 102-10N) of the block chain network. In accordance with various example embodiments described herein, a finite set of process threads can be executed at each imaging device of the block chain network to perform some pre-defined operations. For instance, the process threads can be executed to perform one or more steps of methods 300, 400, and 500 as described earlier in reference to FIGS. 3-5. In this regard, the message flow diagram 600 also represents a finite sequence of events for each process thread that can be executed by a processing unit of the respective imaging device. Illustratively, a process thread that can be executed at the first imaging device (102, 202) can be represented by vertical line 602 and a process thread that can be executed at the second imaging device 604 of the block chain network can be represented by the vertical line 604. Similarly, a process thread that can be executed at a nth imaging device 10N of the block chain network can be represented by the vertical line 60N. Further, horizontal lines in the message flow diagram 600 represents messages communicated amongst the plurality of imaging devices (102-10N) and/or data handled at the respective devices.

In one example scenario, the plurality of imaging devices 102-10N can be installed in an industrial environment (like, but not limited to, factories, manufacturing plants, chemical plants, warehouses, inventories, etc.). In some examples, these devices may correspond to CCTV cameras that may be installed at various locations (e.g. sections) within the industrial environment for purpose of surveillance and monitoring. In this regard, these devices can be communicatively coupled to a monitoring station (e.g. the computational platform 105) that can receive streams of video feed captured by each of these imaging devices. The monitoring station can process the video streams and take further actions like generating alarm, notifying a maintenance team for servicing of an equipment, etc. As described earlier, the plurality of imaging devices (102-10N) can be communicatively coupled in a block chain network. The block chain network can be configured such that each imaging device of the block chain network can share block messages comprising hash codes at periodic intervals of time to remaining imaging devices. Further, the block messages can share on the block chain network can be verified by remaining imaging devices to validate authenticity of the plurality of devices in the block chain network. Referring to FIG. 6, in an example, the imaging devices 102, 104 . . . 10N can represent the plurality of cameras communicatively coupled over the block chain network, as described herein.

Illustratively, at step 608, the first imaging device (102, 202) can generate a block message. As described earlier in reference to FIG. 3, the block message can be generated based on using a secured hash function (e.g. SHA 256). In this regard, the block message may include a hash code generated based on a set of parameters associated with the first imaging device 102, using the secured hash function. In an example, the hash code may be of 256 bit in length. Further, as described earlier, the block message generated by the first imaging device 102 may uniquely identify the first imaging device 102. In other words, no other imaging device of the block chain network can generate a same block message, as that of the block message generated by the first imaging device 102.

In accordance with various example embodiments described herein, the first imaging device 102 may send the block message generated at step 608, to other imaging devices of the block chain network. As described earlier, the block message may be communicated to remaining nodes of the block chain network in any manner, e.g. broadcasted or multi-casted or shared as stand-alone message over a peer to peer communication and/or the like. In an example, the first imaging device 102 can add the block message in the digital ledger maintained by the plurality of imaging devices of the block chain network, thereby, enabling the remaining imaging devices of the block chain network to access the block message generated by the first imaging device 102. Accordingly, the block message generated by the first imaging device 102 can be communicated to, at least one remaining imaging device of the block chain network. For instance, as illustrated, at step 610, the first imaging device 102 can send the block message to the second imaging device 104 of the block chain network.

Illustratively, at step 612, the second imaging device 104 can validate the first imaging device 102. Validation of the first imaging device 102 can be performed in response to receiving of the block message from the first imaging device 102. In this regard, as described earlier, the first imaging device 102 can be validated by the second imaging device 104 based on comparing a hash code present in the block message received from the first imaging device 102 with an expected or pre-defined hash code. Thus, if the hash code present in the block message matches with the expected or pre-defined hash code, at step 612, the first imaging device (102, 202) can be successfully validated. In response to successful validation of the first imaging device (102, 202) at step 614, the second imaging device 104 can send a first message to remaining imaging devices of the block chain network. For instance, as illustrated, the second imaging device 102 may send the first message to the first imaging device 102, the third imaging device 106, and/or the nth imaging device 10N. The first message may be indicative of successful validation of the first imaging device 102. In that manner, each imaging device of the block chain network can be informed about the first imaging device (102, 202) to be a trusted device and a non-compromised entity. Further, based on an update that the first imaging device 102 is successfully validated, the remaining imaging devices (e.g. the third imaging device 106, the nth imaging device 10N) can stop performing a validation operation of the first imaging device 102, as illustrated at steps 618 and 618, respectively. Furthermore, the digital ledger maintained by each imaging device can be updated to reflect the successful validation of the first imaging device 102, as illustrated at steps 620, 622, and 624.

In another example embodiment, if the hash code present in the block message does not matches with the expected or pre-defined hash code, the first imaging device (102, 202) validation of the first imaging device 102 can be deemed un-successful, by the second imaging device. In this regard, the second imaging device 104 may send an alert message to the remaining imaging devices of the block chain network. For instance, as illustrated, step 626, the second imaging device 104 can send the alert message to the third imaging device 106. The alert message can be further forwarded to other imaging devices of the block chain network. For example, as illustrated at step 268, the third imaging device 106 can forward the alert received from the second imaging device to the nth imaging device 10N. Accordingly, the remaining imaging devices of the block chain network can be notified about the un-successful validation of the first imaging device. Thereafter, the remaining imaging devices of the block chain network can update the digital ledger maintained at its respective ends, as illustrated at steps 630, 632, and 634 respectively.

Figure 7:
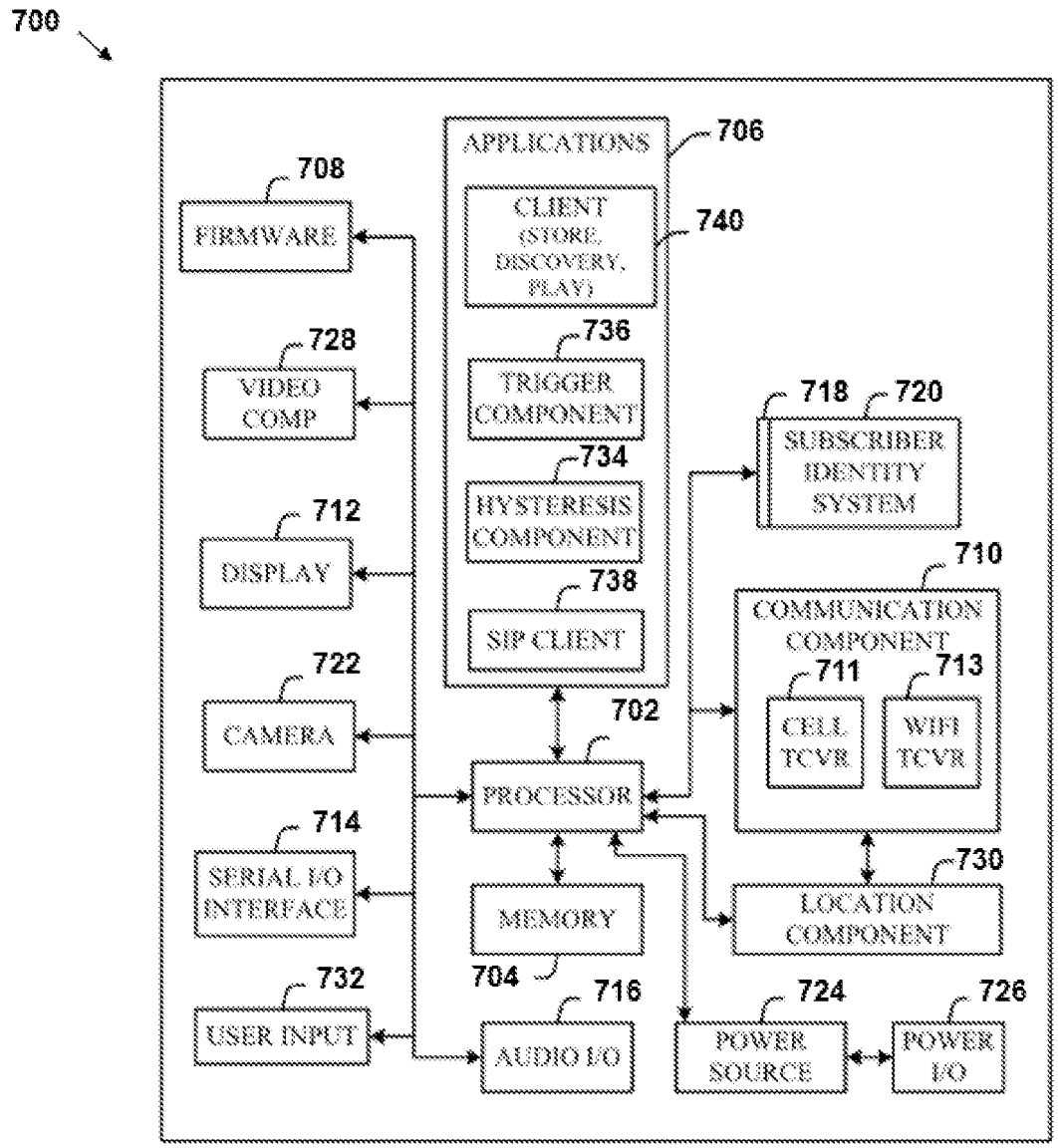
FIG. 7 illustrates a schematic view of an example imaging device of the block chain network, in accordance with some example embodiments described herein.

FIG. 7 illustrates a schematic view 700 of an example imaging device, in accordance with some example embodiments described herein. To this end, the following discussion is intended to provide a brief, general description of an example of a suitable environment in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., described herein in accordance with example embodiments, that can perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

According to some example embodiments, the imaging device 102 can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

According to some example embodiments described herein, a communication media typically embodies computer-readable instructions, data structures, program modules or other data in a modulated data signal such as a carrier wave or other transport mechanism and includes any information delivery media. In this regard, the term "modulated data signal" can correspond to a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

According to some example embodiments, the imaging device 102 can comprise a processor 702 for controlling and processing all onboard operations and functions. A memory 704 interfaces to the processor 702 for storage of data and one or more applications 706 (e.g., a video player software, user feedback component software, etc.). Other applications can include voice recognition of predetermined voice commands that facilitate initiation of the user feedback signals. The applications 706 can be stored in the memory 704 and/or in a firmware 708 and executed by the processor 702 from either or both the memory 704 or/and the firmware 708. The firmware 708 can also store startup code for execution in initializing the imaging device. A communications component 710 interfaces to the processor 702 to facilitate wired/wireless communication with external systems, e.g., cellular networks, VoIP networks, and so on. Here, the communications component 710 can also include a suitable cellular transceiver 711 (e.g., a GSM transceiver) and/or an unlicensed transceiver 713 (e.g., Wi-Fi, WiMax) for corresponding signal communications. The imaging device can be a device such as a cellular telephone, a PDA with mobile communications capabilities, and messaging-centric devices. The communications component 710 also facilitates communications reception from terrestrial radio networks (e.g., broadcast), digital satellite radio networks, and Internet-based radio services networks.

The imaging device can also comprise a display 712 for displaying text, images, video, telephony functions (e.g., a Caller ID function), setup functions, and for user input. For example, the display 712 can also be referred to as a "screen" that can accommodate the presentation of multimedia content (e.g., music metadata, messages, wallpaper, graphics, etc.). The display 712 can also display videos and can facilitate the generation, editing and sharing of video quotes. A serial I/O interface 714 is provided in communication with the processor 702 to facilitate wired and/or wireless serial communications (e.g., USB, and/or IEEE 1394) through a hardwire connection, and other serial input devices (e.g., a keyboard, keypad, and mouse). This support updating and troubleshooting the imaging device, for example. Audio capabilities are provided with an audio I/O component 716, which can include a speaker for the output of audio signals related to, for example, indication that the user pressed the proper key or key combination to initiate the user feedback signal. The audio I/O component 716 also facilitates the input of audio signals through a microphone to record data and/or telephony voice data, and for inputting voice signals for telephone conversations.

In some examples, the imaging device 700 can also comprise a slot interface 718 for accommodating a SIC (Subscriber Identity Component) in the form factor of a card Subscriber Identity Module (SIM) or universal SIM 720 and interfacing the SIM card 720 with the processor 702. However, it is to be appreciated that the SIM card 720 can be manufactured into the imaging device 709 and updated by downloading data and software.

The imaging device can also process IP data traffic through the communication component 710 to accommodate IP traffic from an IP network such as, for example, the Internet, a corporate intranet, a home network, a person area network, etc., through an ISP or broadband cable provider. Thus, VoIP traffic can be utilized by the imaging device and IP-based multimedia content can be received in either an encoded or decoded format.

A video processing component (i.e. a camera 722) can be provided for decoding encoded multimedia content. The video processing component 722 can aid in facilitating the generation, editing and sharing of video quotes. The camera 722 can be configured to capture images of an environment in field of view of the camera 722. The imaging device also includes a power source 724 in the form of batteries and/or an AC power subsystem, which power source 724 can interface to an external power system or charging equipment (not shown) by a power I/O component 726.

According to some example embodiments, the imaging device can also comprise a video component 728 for processing video content received and, for recording and transmitting video content. For example, the video component 728 can facilitate the generation, editing and sharing of video quotes. In some example embodiments, a location tracking component 730 facilitates geographically locating the imaging device. As described hereinabove, this can occur when the user initiates the feedback signal automatically or manually. According to some example embodiments, a user input component 732 facilitates the user initiating the quality feedback signal. In this regard, in some examples, the user input component 732 can also facilitate the generation, editing and sharing of video quotes. According to various example embodiments described herein, the user input component 732 can include such conventional input device technologies such as a keypad, keyboard, mouse, stylus pen, and/or touch screen, for example.

Referring again to the applications 706, a hysteresis component 734 can facilitate the analysis and processing of hysteresis data, which is utilized to determine when to associate with the access point. A software trigger component 736 can be provided that facilitates triggering of the hysteresis component 734 when the Wi-Fi transceiver 713 detects the beacon of the access point. A SIP client 738 enables the imaging device to support SIP protocols and register the subscriber with the SIP registrar server. In some example embodiments, the applications 706 can also include a client 740 that provides at least the capability of discovery, play and store of multimedia content, for example, music.

In some example embodiments, the imaging device, as indicated above related to the communications component 710, includes an indoor network radio transceiver 913 (e.g., Wi-Fi transceiver). This function can support the indoor radio link, such as IEEE 802.11, for the dual-mode GSM handset. In some example embodiments, the imaging device can accommodate at least satellite radio services through a handset that can combine wireless voice and digital radio chipsets into a single handheld device.

Figure 8:
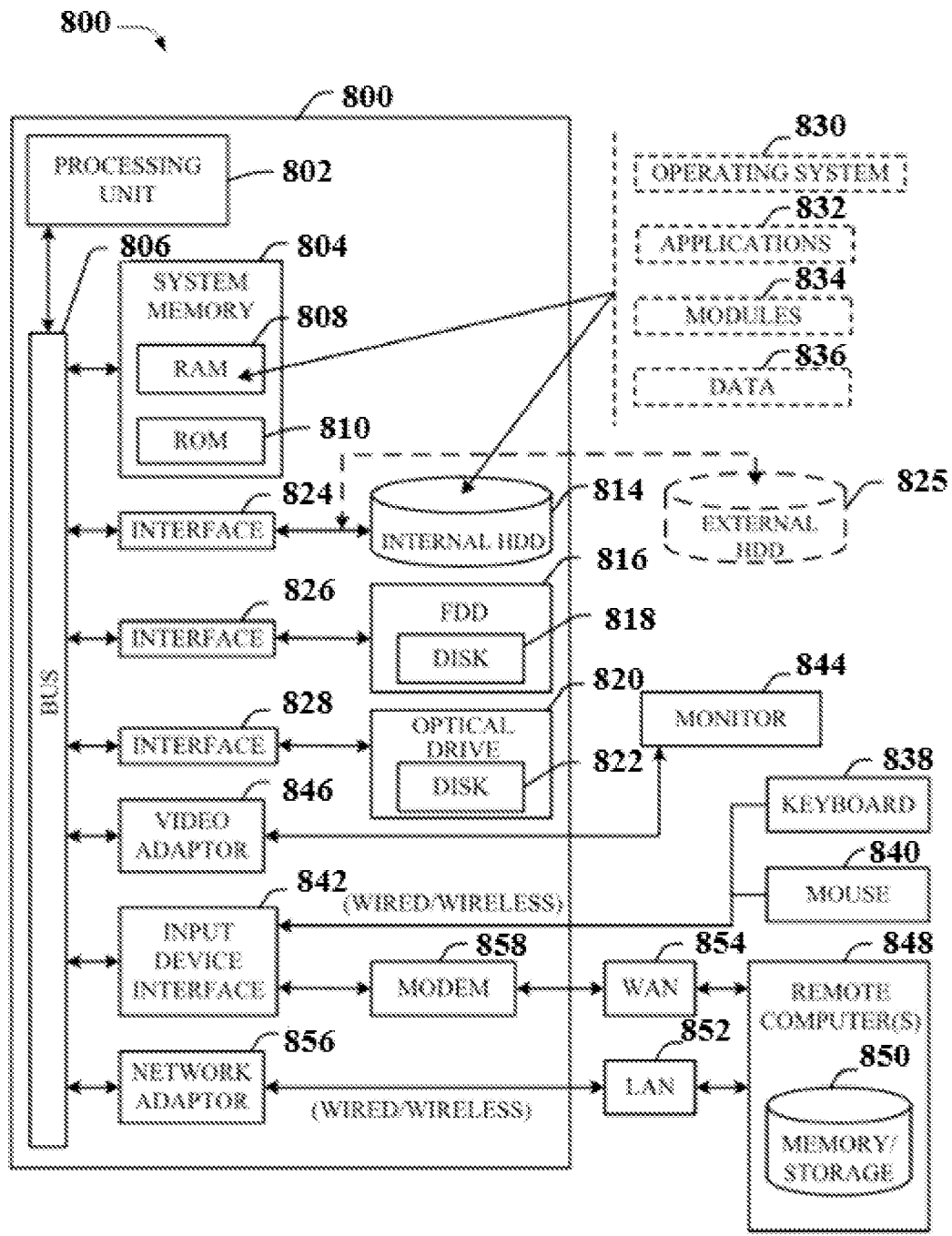
FIG. 8 illustrates a schematic view of an example computational platform communicatively coupled to one or more imaging devices of the block chain network, in accordance with some example embodiments described herein.

FIG. 8 illustrates a schematic view of an example computing device 800, in accordance with some example embodiments described herein. The computing device described in FIG. 8, according to some examples, can correspond to any of the plurality of imaging devices (102-10N) and/or the computational platform 105, as described before. The computing device 800, in some examples, can correspond to a computer or an electronic device.

Referring now to FIG. 8, there is illustrated a block diagram of the computing device 800 operable to execute the functions and operations performed in the described example embodiments. In some example embodiments, the computing device 800 can provide networking and communication capabilities between a wired or wireless communication network and a server and/or communication device. In order to provide additional context for various aspects thereof, FIG. 8 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

According to said example embodiments, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, mini-computers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

In accordance with some example embodiments, computing devices typically include a variety of media, which can include computer-readable storage media or communications media, which two terms are used herein differently from one another as follows.

According to some example embodiments, a computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

In some examples, communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 8, implementing various aspects described herein with regards to the end-user device can comprise the computing device 800 comprising a processing unit 802, a system memory 804 and a system bus 806. The system bus 806 can be configured to couple system components including, but not limited to, the system memory 804 to the processing unit 802. In some example embodiments, the processing unit 802 can be any of various commercially available processors. To this end, in some examples, dual microprocessors and other multi-processor architectures can also be employed as the processing unit 802.

According to some example embodiments, the system bus 806 can be any of several types of bus structure that can further interconnect to a memory bus (with or without a memory controller), a peripheral bus, and a local bus using any of a variety of commercially available bus architectures. In some examples, the system memory 804 can comprise, read-only memory (ROM) 808 and random-access memory (RAM) 810. According to some example embodiments, a basic input/output system (BIOS) is stored in a non-volatile memory 812 such as ROM, EPROM, EEPROM, which BIOS contains the basic routines that help to transfer information between elements within the computing device 800, such as during start-up. The RAM 810 can also comprise a high-speed RAM such as static RAM for caching data.

According to some example embodiments, the computing device 800 can further comprise an internal hard disk drive (HDD) 814 (e.g., EIDE, SATA), which internal hard disk drive 814 can also be configured for external use in a suitable chassis (not shown), a magnetic floppy disk drive (FDD) 816, (e.g., to read from or write to a removable diskette 818) and an optical disk drive 820, (e.g., reading a CD-ROM disk 822 or, to read from or write to other high capacity optical media such as the DVD). In some examples, the hard disk drive 814, magnetic disk drive 816 and optical disk drive 820 can be connected to the system bus 806 by a hard disk drive interface 824, a magnetic disk drive interface 826 and an optical drive interface 828, respectively. According to some example embodiments, the interface 824 for external drive 825 implementations can comprise, at least one or both of Universal Serial Bus (USB) and IEEE 1394 interface technologies. Other external drive connection technologies are within contemplation of the subject embodiments.

According to some example embodiments described herein, the drives and their associated computer-readable media provide nonvolatile storage of data, data structures, computer-executable instructions, and so forth. For the computing device 800 the drives and media accommodate the storage of any data in a suitable digital format. Although the description of computer-readable media above refers to a HDD, a removable magnetic diskette, and a removable optical media such as a CD or DVD, it may be appreciated by those skilled in the art that other types of media which are readable by a computing device 800, such as zip drives, magnetic cassettes, flash memory cards, cartridges, and the like, can also be used in the example operating environment, and further, that any such media can contain computer-executable instructions for performing the methods of the disclosed embodiments.

In some example embodiments, a number of program modules can be stored in the drives and RAM 808, including an operating system 830, one or more application programs 832, other program modules 834 and program data 836. To this end, in some examples, all or portions of the operating system, applications, modules, and/or data can also be cached in the RAM 808. It is to be appreciated that the various embodiments can be implemented with various commercially available operating systems or combinations of operating systems.

According to some example embodiments, a user can enter commands and information into the computing device 800 through one or more wired/wireless input devices, e.g., a keyboard 838 and a pointing device, such as a mouse 840. Other input devices (not shown) may include a microphone, an IR remote control, a joystick, a game pad, a stylus pen, touch screen, or the like. In some examples, these and other input devices are often connected to the processing unit 802 through an input device interface 842 that is coupled to the system bus 806, but can be connected by other interfaces, such as a parallel port, an IEEE 1394 serial port, a game port, a USB port, an IR interface, etc.

According to some example embodiments, a monitor 844 or other type of display device can also be connected to the system bus 806 through an interface, such as a video adapter 846. In addition to the monitor 844, the computing device 800 can also comprise other peripheral output devices (not shown), such as speakers, printers, etc.

According to some example embodiments, the computing device 800 can operate in a networked environment using logical connections by wired and/or wireless communications to one or more remote computers, such as a remote computer(s) 848. In some examples, the remote computer(s) 848 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 850 is illustrated. According to some example embodiments, the logical connections depicted include wired/wireless connectivity to a local area network (LAN) 852 and/or larger networks, e.g., a wide area network (WAN) 854. Such LAN and WAN networking environments are commonplace in offices and companies, and facilitate enterprise-wide computer networks, such as intranets, all of which may connect to a global communications network, e.g., the Internet.

In some examples, when used in a LAN networking environment, the computing device 800 can be connected to the local network 852 through a wired and/or wireless communication network interface or adapter 856. The adapter 856 may facilitate wired or wireless communication to the LAN 852, which may also include a wireless access point disposed thereon for communicating with the wireless adapter 856.

In alternate examples, when used in a WAN networking environment, the computing device 800 can include a modem 858, or can be connected to a communications server on the WAN 854 or has other means for establishing communications over the WAN 854, such as by way of the Internet. The modem 858, which can be internal or external and a wired or wireless device, is connected to the system bus 806 through the input device interface 842. In a networked environment, program modules depicted relative to the computer, or portions thereof, can be stored in the remote memory/storage device 850. It will be appreciated that the network connections shown are exemplary and other means of establishing a communications link between the computers can be used.

According to some example embodiments, the computing device 800 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can further comprise at least Wi-Fi and Bluetooth™ wireless technologies. Thus, the communication can be a predefined structure as with a conventional network or simply an ad hoc communication between at least two devices.

In accordance with some example embodiments, Wi-Fi, or Wireless Fidelity, allows connection to the Internet from a couch at home, a bed in a hotel room, or a conference room at work, without wires. To this end, Wi-Fi referred herein, is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. Further, in accordance with some example embodiments described herein, a Wi-Fi network can be used to connect computers or the plurality of electronic devices 102-10N to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

It may be noted that, as used in this specification and the appended claims, the singular forms "a," "an" and "the" comprise plural referents unless the content clearly dictates otherwise.

References within the specification to "one embodiment," "an embodiment," "embodiments", or "one or more embodiments" are intended to indicate that a particular feature, structure, or characteristic described in connection with the embodiment is comprised in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

Detailed embodiments are disclosed herein; however, it is to be understood that the disclosed embodiments are merely exemplary, which may be embodied in various forms. Therefore, specific structural and functional details disclosed herein are not to be interpreted as limiting, but merely as a basis for the claims.

While it is apparent that the illustrative embodiments described herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present disclosure.

What is claimed is:

1. A method comprising:
establishing a block chain network of a plurality of imaging devices, wherein at least a first imaging device of the plurality of imaging devices of the block chain network is configured to be validated by at least a second imaging device of the plurality of imaging devices, wherein, at a change of a set of parameters, a block message is generated by the first imaging device of the block chain network by using a secured hash function based on the set of parameters associated with the first imaging device, wherein the set of parameters comprises: a first imaging device identifier, a network fluctuation parameter indicative of at least one of a fluctuation of a recording rate and a streaming rate, and at least one inertial parameter indicative of a physical movement associated with the first imaging device; and sending by the first imaging device the block message to the second imaging device of the plurality of imaging devices, wherein the block message facilitates validation of the first imaging device.

2. The method of claim 1, further comprising receiving, by the first imaging device, a first message indicative of a successful validation of the first imaging device, wherein the first imaging device is validated by the second imaging device based on a comparison of the block message with a predefined block message.

3. The method of claim 2 further comprising:
adding, by the first imaging device, the block message in a ledger maintained by each of the plurality of imaging devices, wherein addition of the block message in the ledger is based on a previous block message generated based on a previous secured hash function.

4. The method of claim 1 further comprising receiving, by the first imaging device, an alert based on an un-successful validation of the first imaging device.

5. The method of claim 3, wherein the plurality of imaging devices is configured to capture a video stream of one or more sections of an industrial environment and wherein the method further comprises:
determining, by the first imaging device, a compromise of the first imaging device; and
initiating termination of the first imaging device from the block chain network.

6. The method of claim 1, wherein the secured hash function is a SHA-256 cryptographic hash function.

7. The method of claim 1, wherein the block message is generated in response to a change in at least one parameter of the set of parameters.

8. The method of claim 1, wherein the network fluctuation parameter is further indicative of at least one of: a blip, a long pause, a short pause, a recording rate, and a slow streaming, associated with a video stream captured by the first imaging device.

9. A non-transitory computer readable medium that stores thereon computer-executable instructions that, in response to execution by a processor, perform operations comprising:
establishing a block chain network of a plurality of imaging devices,
wherein, at a change of a set of parameters, a block message is generated by a first imaging device of the block chain network by using a secured hash function based on the set of parameters associated with the first imaging device, wherein the set of parameters comprises: a first imaging device identifier, a network fluctuation parameter indicative of at least one of a fluctuation of a recording rate and a streaming rate, and at least one inertial parameter indicative of a physical movement associated with the first imaging device; and sending the block message to a second imaging device of the plurality of imaging devices, wherein the block message facilitates validation of the first imaging device.

10. The non-transitory computer readable medium of claim 9 that stores thereon computer-executable instructions that, in response to execution by the processor, perform operations further comprising:
receiving a first message indicative of a successful validation of the first imaging device, wherein the first imaging device is validated based on comparison of the block message with a predefined block message.

11. The non-transitory computer readable medium of claim 9 that stores thereon computer-executable instructions that, in response to execution by the processor, perform operations further comprising receiving an alert based on an un-successful validation of the first imaging device.

12. The non-transitory computer readable medium of claim 9 that stores thereon computer-executable instructions that, in response to execution by the processor, perform operations further comprising:
determining a compromise of the first imaging device; and initiating termination of the first imaging device from the block chain network.

13. The non-transitory computer readable medium of claim 9 that stores thereon computer-executable instructions that, in response to execution by the processor, perform operations further comprising:
adding the block message in a ledger maintained by each of the plurality of imaging devices, wherein addition of the block message in the ledger is based on a previous block message generated based on a previous secured hash function.

14. A system comprising:
a processor communicatively coupled to at least two imaging devices from amongst a plurality of imaging devices communicatively coupled in a block chain network, the processor configured to:
initiate, by a first imaging device of the block chain network, transmission of a block message to a second imaging device of the plurality of imaging devices, wherein, at a change of a set of parameters, the block message is generated by the first imaging device of the block chain network by using a secured hash function based on the set of parameters associated with the first imaging device, wherein the set of parameters comprises: a first imaging device identifier, a network fluctuation parameter indicative of at least one of a fluctuation of a recording rate and a streaming rate, and at least one inertial parameter indicative of a physical movement associated with the first imaging device; and
validate the first imaging device in response to receiving of a first message from the second imaging device by the first imaging device of the block chain network, wherein the first imaging device is validated based on comparison of the block message with a predefined block message.

15. The system of claim 14, wherein the processor is configured to further broadcast the first message to the plurality of imaging devices.

16. The system of claim 14, wherein the processor is configured to further: send an alert to the second imaging device based on an un-successful validation of the first imaging device; and initiating termination of the first imaging device from the block chain network.

17. The system of claim 14, wherein the first message is indicative of a successful validation of the first imaging device and wherein the processor is configured to further: add the block message in a ledger maintained by each of the plurality of imaging devices, wherein addition of the block message in the ledger is based on a previous block message generated based on a previous secured hash function.

18. The system of claim 14, wherein the secured hash function is a SHA-256 cryptographic hash function.

19. The system of claim 14, wherein the processor is configured to generate the block message in response to a change in at least one parameter of the set of parameters associated with the first imaging device.

20. The system of claim 14, wherein the network fluctuation parameter is further indicative of at least one of a blip, a long pause, a short pause, a recording rate, and a slow streaming, associated with a video stream captured by the first imaging device.

* * * * *